United States Patent [19]
Oliver et al.

[11] Patent Number: 6,064,693
[45] Date of Patent: May 16, 2000

[54] SYSTEM AND METHOD FOR HANDLING UNDERRUN OF COMPRESSED SPEECH FRAMES DUE TO UNSYNCHRONIZED RECEIVE AND TRANSMIT CLOCK RATES

[75] Inventors: David C. Oliver; Edwin A. Bertness, both of San Antonio, Tex.

[73] Assignee: Data Race, Inc., San Antonio, Tex.

[21] Appl. No.: 08/845,639

[22] Filed: May 1, 1997

Related U.S. Application Data

[60] Provisional application No. 60/039,223, Feb. 28, 1997.

[51] Int. Cl.[7] .................................. H04L 5/16; H04B 1/66
[52] U.S. Cl. ............................................ 375/222; 375/377
[58] Field of Search ...................................... 375/222, 377, 375/216, 285, 346, 351; 379/93.01, 93.08

[56] References Cited

U.S. PATENT DOCUMENTS

| | | | |
|---|---|---|---|
| 5,131,013 | 7/1992 | Choi | 375/377 |
| 5,367,534 | 11/1994 | Chou et al. | 375/222 |
| 5,450,530 | 9/1995 | Snyder et al. | 375/220 |
| 5,546,395 | 8/1996 | Sharma et al. | 375/246 |
| 5,596,602 | 1/1997 | Couwenhoven et al. | 375/377 |
| 5,671,250 | 9/1997 | Bremer et al. | 375/377 |
| 5,692,035 | 11/1997 | O'Mahony et al. | 379/93.01 |
| 5,818,913 | 10/1998 | O'Mahony | 379/93.08 |
| 5,898,696 | 4/1999 | Proctor et al. | 370/468 |

*Primary Examiner*—Tesfaldet Bocure
*Attorney, Agent, or Firm*—Conley, Rose & Tayon, P.C.; Robert C. Kowert; Jeffrey C. Hood

[57] ABSTRACT

A system and method for compensating for slight variances between a first rate at which a far end modem transmits a series of data frames to a near end modem and a second rate at which the near end modem requires reception of the series of data frames. The modems comprise a data pump which receives data frames from the other modem at the first rate on a telephone line. The data frames are received by a data pump which provides the frames a character at a time to a controller coupled to the data pump. The controller places the characters into a pair of frame buffers in a memory coupled to the controller. The controller receives data frames from a vocoder at the second rate to be transmitted to the other modem. The controller attempts to provide data frames to the vocoder at the second rate in order to avoid distortion in the data frame flow, in particular, distortion in the compressed speech. The method comprises determining according to the second rate if a next data frame in the series of data frames has been received and providing the next data frame to a decoder if the next data frame has been received, but providing a filler frame to the decoder if the next data frame has not been received. The modem repeatedly performs these steps for each of the data frames in the series of frames. Preferably the data frames are compressed speech frames and the decoder is a vocoder for decoding the compressed speech frames. Preferably, the filler frame comprises a quiet frame which has been produced by recording essentially silence, i.e., only white noise. Preferably, the modems comprise DSVD modems. The modem also determines if the next data frame is bad if the data frame has been received and provides a filler frame to the decoder if the next data frame is bad.

22 Claims, 4 Drawing Sheets

SYSTEM AND METHOD FOR HANDLING UNDERRUN OF COMPRESSED SPEECH FRAMES DUE TO UNSYNCHRONIZED RECEIVE AND TRANSMIT CLOCK RATES

PRIORITY DATA

This application claims priority of Provisional Application Ser. No. 60/039,223 titled "System and Method for Handling Underrun of Compressed Speech Frames Due to Unsynchronized Receive and Transmit Clock Rates" filed Feb. 28, 1997, whose inventors were David C. Oliver and Edwin A. Bertness, and which was assigned to Data Race.

FIELD OF THE INVENTION

The present invention relates to almost synchronous reception of digitized analog signals, and in particular of compressed voice signals.

DESCRIPTION OF THE RELATED ART

A typical communication path between two subscribers in a telephone network, such as the public switched telephone network (PSTN), comprises a near end subscriber unit and a far end subscriber unit coupled together by a transmission line. Typically the transmission line is actually comprised of two or more separate transmission lines each coupled together by switches in the network. Each switch is located in what is commonly referred to as a central office (CO). The subscriber units typically comprise a telephone handset, modem, telephone answering machine, or other communications device.

Digital storage and communication of voice or speech signals has become increasingly prevalent in modem society, in particular in telephony. Digital communication of speech signals comprises generating a digital representation of the speech signals and then transmitting those digital representations to a receiver upon a communications path. The receiver receives the digital representation of the speech and converts the digital representation of the speech signals back into the original speech, or at least an approximation of the original speech.

One prevalent form of digital speech representation is a parametric representation of the speech signals. A parametric representation of speech signals involves representing the speech signal as a plurality of parameters which affect the output of a model for speech production. A parametric representation of speech signals is accomplished by first generating a digital waveform representation using speech signal sampling and quantization, and then further processing the digital waveform to obtain parameters of the model for speech production. Examples of parameters include a pitch parameter and an amplitude parameter. The amplitude parameter is also referred to as the volume parameter. Parametric representations of speech signals are commonly referred to as voice encoded speech. Because the amount of digital information which represents the voice encoded speech is typically much less than that required for the original speech, the voice encoded speech is also commonly referred to as compressed speech.

Once the voice encoded speech has been generated it may be transmitted to a receiver. The receiver receives the voice encoded speech and decodes it to produce an approximation of the original speech. The operation of decoding the voice encoded speech involves applying the parameters to a speech production model to generate an approximation of the original speech. Devices which perform voice encoding and decoding are commonly referred to as voice encoder/decoders, or vocoders.

One recent application of using compressed speech in digital communications is in Digital Simultaneous Voice and Data (DSVD) modems. DSVD modems employ techniques for multiplexing compressed speech with digital data for transmission over a normal telephone line. DSVD modems thus enable transmission of both speech (voice) and data over a single POTS telephone line. This is made possible by compressing the voice portion of the transmission, thus reducing the amount of bandwidth required for the voice transmission and using the remaining available bandwidth for data transmission.

In a DSVD communication, a first DSVD modem compresses a transmitting subscriber's speech, time multiplexes it with data from the transmitting subscriber's digital device such as a computer, and transmits the multiplexed speech and data stream upon a telephone line to a second DSVD modem. The second DSVD modem receives the multiplexed speech and data stream, separates the speech and data, and decodes the compressed speech back into the original analog speech signal so that it can be provided to the receiving subscribe's telephone. The same process occurs in the opposite direction, thus enabling the two subscribers at each end of the telephone line to speak to one another, while simultaneously transferring data over the same line. A common use of DSVD modems is in the area of collaborative work, such as a whiteboard application which allows two users to annotate a shared document, for example, while simultaneously speaking to one another about the annotations on the same telephone line.

Each DSVD modem comprises a vocoder for performing voice encoding/decoding. Typically, a clock source coupled to the vocoder is used by the vocoder to determine the rate at which the vocoder transmits compressed speech frames. This rate is referred to as the transmit rate. The time period associated with the transmit rate is referred to as the transmit period. A typical transmit period of compressed speech is 30 milliseconds. In general, the time required for the vocoder to process a received compressed speech frame into an audio signal is equal to the transmit period. That is, the vocoder uses the same clock source to transmit compressed speech frames as it does to process received compressed speech frames. Hence, the "required" frame receive rate of the vocoder is equal to the transmit rate of the vocoder.

If a vocoder does not receive frames at its required frame receive rate, a condition referred to as data underrun occurs. When underrun occurs, the vocoder may produce an audio signal which has considerable audible distortion, or even total loss of intelligibility. Often the distortion is very unpleasant, noticeable and annoying to the listening subscriber.

Typically, control circuitry of the modem provides frames to the vocoder at the rate which the control circuitry receives compressed speech frames from the far end modem. In such a scenario, as long as the transmit rates of the two modems are identical, i.e., are synchronized, this works well. However, if the two transmit clocks are slightly unsynchronized, and particularly if the transmit rate of the far end modem is slower than the required frame receive rate of the near end vocoder, then an underrun condition may occur, resulting in distorted speech. Therefore, an improved method and system for handling underrun and overrun of digital data frames is desired.

SUMMARY OF THE INVENTION

The present invention provides a system and method for compensating for slight variances between the transmit rate of a far end modem and the required frame receive rate of a near end modem. More particularly, the present invention compensates for variances between a transmit rate at which a far end modem transmits a series of data frames to a near end modem and a required frame receive rate at which the near end modem requires reception of the series of data frames.

The modems each include a data pump which receives data frames from the other modem at the far end transmit rate on a telephone line. The data pump provides the frames a character at a time to a controller coupled to the data pump. The controller places the characters into a pair of frame buffers. Preferably, the frame buffers are comprised within a memory coupled to the controller.

The modem further comprises a vocoder coupled to the controller which provides the controller a signal indicating the required frame receive rate, which is also the transmit rate, of the vocoder. Advantageously, the controller provides frames to the vocoder at the vocoder's required frame receive rate. That is, the controller synchronizes the rate which it provides frames to the vocoder with the vocoder's transmit rate, thereby avoiding an underrun condition within the vocoder. In the event that an underrun occurs with respect to the data pump providing frames to the controller, i.e., if the data pump does not provide frames to the controller at the required frame receive rate of the vocoder, the controller advantageously provides a quiet frame to the vocoder.

The method comprises determining according to the required frame receive rate if a next data frame in the series of data frames has been received. If so, the method provides the next data frame to the decoder. If the next data frame has not been received, the method provides a filler frame, preferably a quiet frame, to the decoder. The modem repeatedly performs these steps for each of the data frames in the series of frames. Preferably the data frames are compressed speech frames and the decoder is a vocoder for decoding the compressed speech frames. Preferably, the filler frame is a quiet frame comprising a compressed speech frame which has been produced by recording essentially silence, i.e., only white noise. Preferably, the modems comprise DSVD modems. The modem also determines if the next data frame is bad if the data frame has been received and provides a filler frame to the decoder if the next data frame is bad.

Thus, by providing filler frames in response to underrun conditions, the present method advantageously performs synchronization of the first and second data rates, thereby reducing the audible distortion which may be detectable by a subscriber.

BRIEF DESCRIPTION OF THE INVENTION

A better understanding of the present invention can be obtained when the following detailed description of the preferred embodiment is considered in conjunction with the following drawings, in which.

Figure 1:
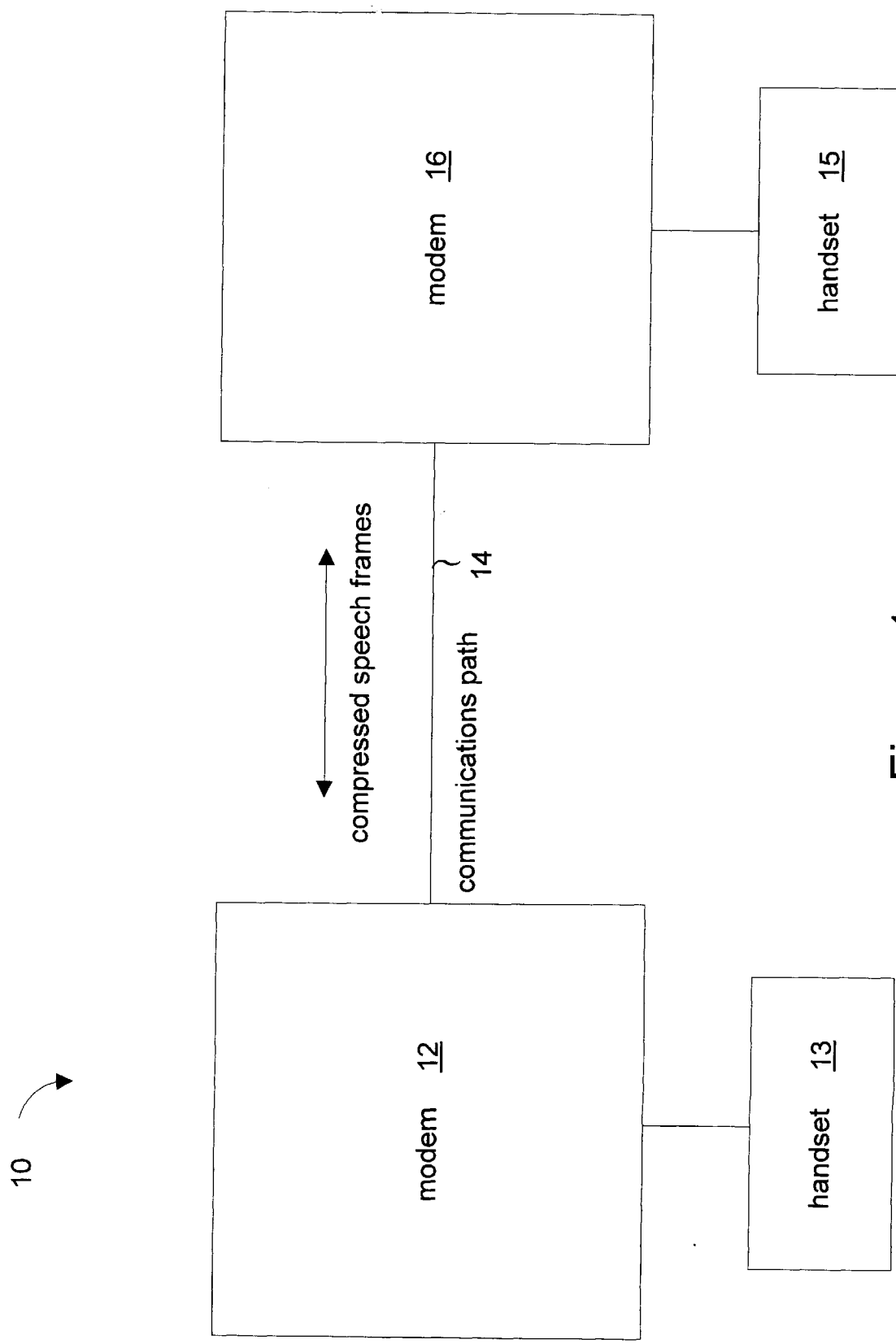
FIG. 1 is a block diagram of a telecommunications system comprising modems according to the preferred embodiment of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Referring now to FIG. 1, a block diagram of a telecommunications system 10 comprising modems according to the preferred embodiment of the present invention is shown. The term "modem" used herein is intended to refer to any of various types of communication devices, including analog modems, DSVD modems, ISDN terminal adapters, xDSL devices, among others.

The system 10 comprises a first modem 12 in communication with a second modem 16 via a communications path 14. Preferably, the communications path comprises a first telephone line coupled to the first modem 12 and a second telephone line coupled to the second modem 16, wherein the two telephone lines are coupled together via and/or comprise part of the public switched telephone network (PSTN). Preferably, each of the modems is coupled to a subscriber unit, such as handsets 13 and 15, which are used by a subscriber to speak to a subscriber at the other end and to listen to the speech from the other subscriber.

Preferably, each of the modems 12 and 16 are modems operable to perform digital simultaneous voice and data (DSVD) communications. The modems 12 and 16 transmit data to each other upon the communications path 14. Preferably, the data comprises frames of compressed speech data. In the preferred embodiment, the DSVD modems transmit compressed speech multiplexed with digital data for transmission over a telephone line.

The present invention comprises a system and method for compensating for slight variances between the transmit rate of a far end modem and the required frame receive rate of a near end modem. However, the present invention is not limited to synchronizing transmitted frames of compressed speech data, but rather is applicable to any digital data which is transferred in frames, such as video data, and which may tolerate a certain amount of loss of frames and/or a certain amount of inserted filler frames. A filler frame is defined herein as a frame inserted into a stream of data frames to compensate for lack of reception of one or more frames in the transmission. A filler frame may have little or no impact on the system. The filler frame may comprise a quiet frame for speech applications, as will be described below. In one embodiment, the filler frame comprises a previous or repeated frame. Furthermore, the present invention is not limited to duplex transmission of digital data, but rather is applicable to simplex transmission in which the clock rate of the transmitter may become unsynchronized with the clock rate of the receiver.

Figure 2:
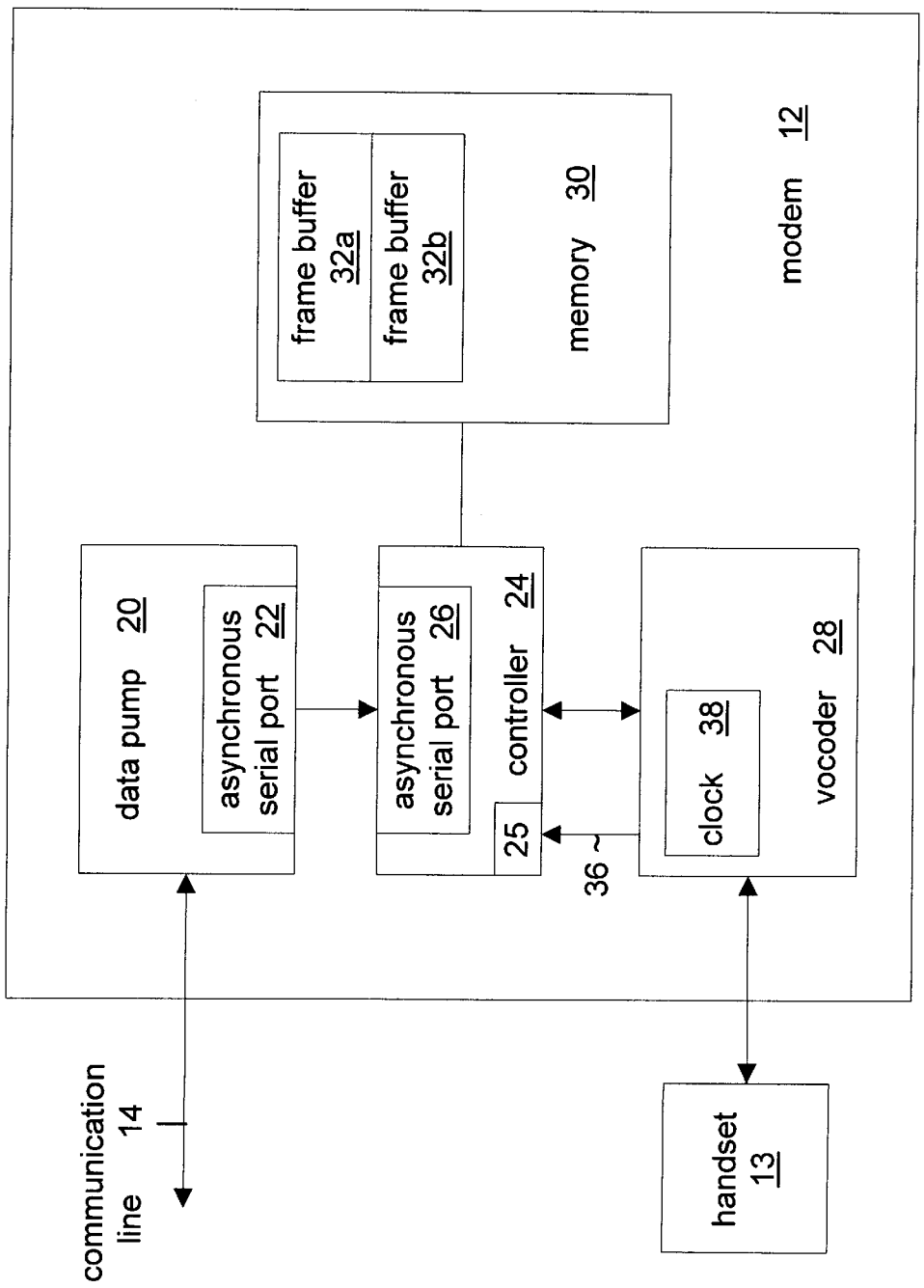
FIG. 2 is a block diagram of the modem of FIG. 1.

Referring now to FIG. 2, a block diagram of the modem 12 of FIG. 1 is shown. The present invention may be incorporated in one or both modems 12 and 16. The modem 12 is described as representative of one or both of the modems 12 and 16. The modem 12 comprises a data pump 20 coupled to the communications line 14. Data pumps are well known in the art of modem design. Preferably, the data pump 20 is a Lucent Technologies M-1634. The data pump performs the functions, among others, of modulating digital data for transmission on the communications line 14 to the far end subscriber and demodulating modulated data received from the far end subscriber into digital data. Preferably, the data pump 20 comprises an asynchronous serial interface 22 for transferring data frames between an asynchronous serial interface 26 comprised in a controller 24.

The controller 24 performs various control functions of the modem 12. Preferably, the modem 12 is a DSVD modem, and the controller 24 demultiplexes simultaneously transmitted, i.e., multiplexed, voice and data received from a far end DSVD modem. The controller 24 is operable to receive compressed speech frames, i.e., voice encoded speech, from the data pump 20 and provide the data frames to a vocoder 28 coupled to the controller 24. The controller 24 is also operable to receive compressed speech frames from the vocoder 28 and provide the compressed speech frames to the data pump 20.

In particular, the controller 24 is operable to handle data overrun of data frames received from the data pump 20 by discarding frames as necessary, as will be described below. The controller 24 is also operable to handle data underrun of frames received from the data pump 20 by providing filler frames, preferably either "quiet" frames or repeat frames, as necessary, as will be described below in more detail. The controller 24 comprises any processor device which is capable of executing a stored program of instructions or embedded controller device. Preferably, the stored instructions are comprised within a non-volatile memory 25, such a read-only memory (ROM), programmable ROM (PROM), erasable PROM (EPROM), FLASH memory, among others. The non-volatile memory 25 may be comprised within or without the controller 24. Preferably, the controller 24 comprises a processor, such as a microprocessor core and peripheral devices, such as the asynchronous serial interface 26. In one embodiment, the controller 24 is a Zilog Z80182 microcontroller.

Vocoders, such as vocoder 28, are well known in the art of voice encoded speech. Preferably, the vocoder 28 comprises an AT&T 1635. The vocoder 28 performs, among others, encoding of speech received from the handset 13 and providing the compressed speech frames to the controller 24. The vocoder 28 further receives compressed speech frames from the controller 24 and decodes the compressed speech frames back into analog voice signals which are provided to the handset 13 for reproduction to the subscriber. The vocoder 28 comprises a clock source 38, which the vocoder 28 uses to determine the rate at which to transmit frames to the controller 24. This clock rate is referred to as the transmit clock rate.

Preferably, the controller 24 further comprises an interrupt request input 36. The vocoder generates periodic interrupt requests to the controller 24 processor at the transmit clock rate in order to request the controller 24 to service a compressed speech frame from the vocoder 28. The generation of an interrupt request by the vocoder 28 is an event to the controller 24, which is a notification of a transmitted frame from the vocoder 28 to the controller 24. In one embodiment, the vocoder 28 provides frames to the controller 24 at a transmit clock rate of every 30 milliseconds. That is, the transmit clock period is 30 milliseconds. The transmit clock rate of the vocoder 28 is also the required frame rate at which the vocoder must receive frames in order for an underrun condition not to occur. The controller 24 attempts to provide frames to the vocoder 28 at the required receive frame rate, i.e., at the transmit clock rate. That is, each time the controller 24 receives a frame from the vocoder 28 for transmission to the far end modem, the controller 24 attempts to provide a frame to the vocoder 28. This will be described in more detail below.

A memory 30 is coupled to the controller 24. Preferably, the memory is used to store data and programs instructions executed by the controller 24. Preferably, the memory 30 is also used to buffer frames received from the data pump 20 before being provided to the vocoder 28, and to buffer frames received from the vocoder 28 before being provided to the data pump 20. In particular, the memory comprises two or more buffers 32a and 32b (referred to collectively as 32) for buffering frames received from the data pump 20. Preferably, the asynchronous serial port 26 on the controller 24 receives bytes or blocks of data, and the controller 24 places the bytes or blocks of data into one of the frame buffers 32 until an entire frame has been placed into the buffer. Preferably, the controller 24 fills the buffers in a circular FIFO manner when filling the buffers as data bytes come in from the data pump 20. That is, the controller 24 alternates, i.e., "ping-pongs", between the buffers since there are two buffers. In an alternate embodiment, more than two frame buffers are employed and the controller 24 fills the frame buffers in a circular FIFO manner. Likewise, the controller 24 empties the frame buffers in a circular FIFO manner as the controller 24 provides frames to the vocoder 28.

In one embodiment, a frame comprises 39 characters. Of the 39 characters, 32 of the characters comprises voice encoded speech, 5 of the characters comprise standard protocol control characters, such as v.42 protocol characters, and 2 characters comprise voice frame specific control characters. Preferably, the standard protocol characters comprise error checking and/or error correction characters, such as cyclic redundancy code (CRC) characters. If the controller 24 detects a bad frame, such as a frame with a bad CRC value, the controller 24 discards the frame.

The data pump 20 provides bytes of data to the controller 24 as they are received from the far end modem. That is, the controller 24 accumulates frames into the buffers 32 at the rate which the far end modem transmits them. The controller 24 attempts to maintain synchronization between the transmit rate and the required frame receive rate of the vocoder 28 by discarding frames when a data overrun condition occurs and providing filler frames to the vocoder 28 when a data underrun condition occurs, as will be described below.

Figure 3:
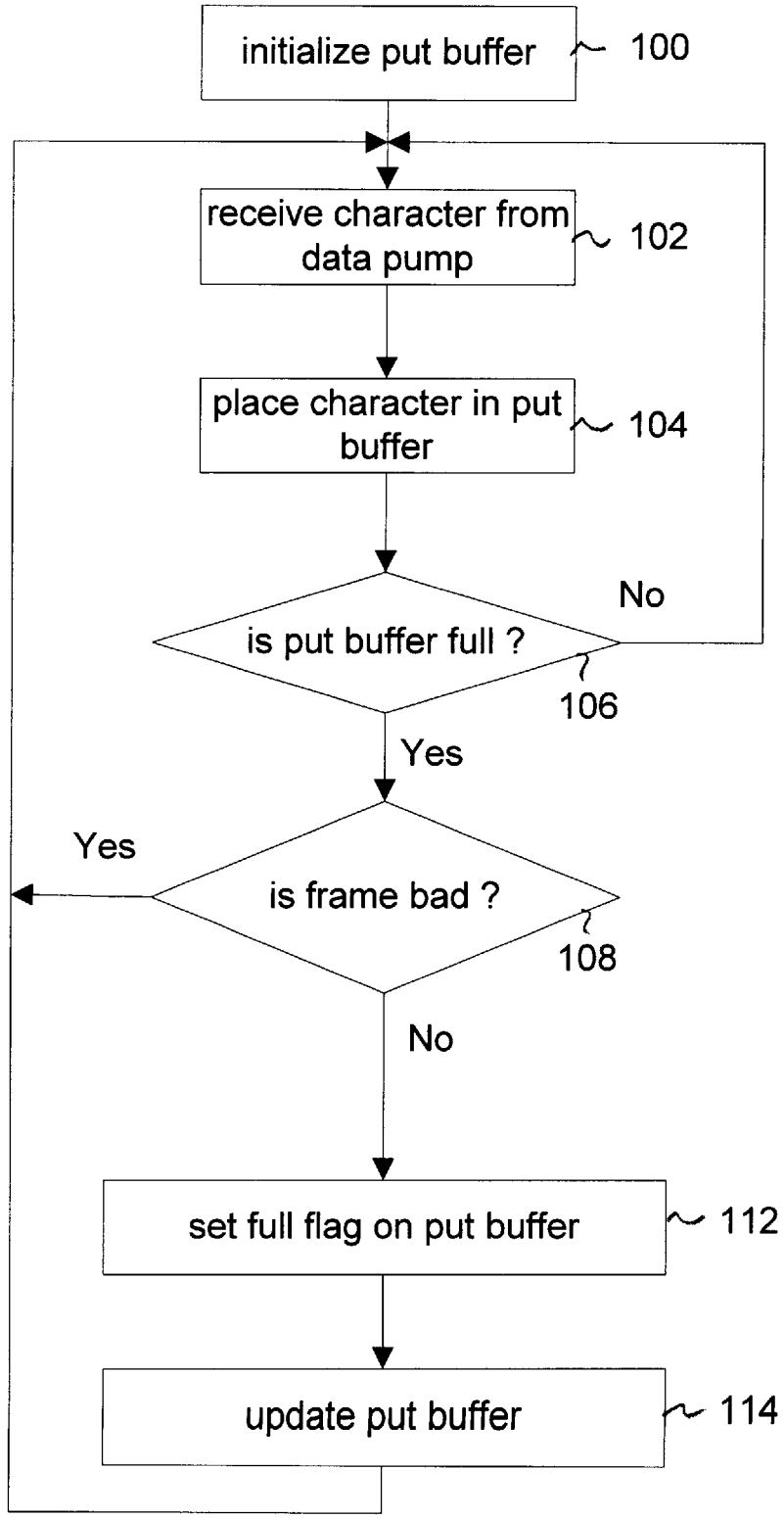
FIG. 3 is a flowchart illustrating operation of the controller of FIG. 2 in acquiring frames from the data pump of FIG. 2 and placing the frames in the buffers of FIG. 2 in a manner which handles data overrun and maintains synchronization between the transmit rate and the receive rate.

Referring now to FIG. 3, a flowchart illustrating operation of the controller 24 in acquiring frames from the data pump 20 and placing the frames in the buffers 32 in a manner which handles data overrun and maintains synchronization between the transmit rate and the required receive rate is shown. The controller 24 maintains an indication of which of the frame buffers 32 of FIG. 2 is to be the next buffer to put data frame bytes into as they are received from the data pump 20. This buffer is referred to as the "put buffer." Preferably, the controller 24 maintains a put buffer pointer which points at the current put buffer. At initialization time, the controller 24 initializes the put buffer pointer to one of the buffers 32, in step 100. The controller 24 then waits to receive a character from the data pump 20, i.e., for the far end modem to begin transmitting data frames.

During operation, the controller 24 receives a character from the data pump 20, in step 102. Preferably, the asynchronous serial interface 26 interrupts the controller 24 processor when a character has been received from the data pump 20. In response to the interrupt, the controller 24 reads the character from the asynchronous serial interface 26 and places the character in the put buffer, in step 104.

When the controller 24 has placed the character into the put buffer, the controller 24 determines if the get buffer is full, i.e., if an entire frame has been placed into the put buffer, in step 106. If the put buffer is not full, the controller 24 returns to step 102 to wait for another character from the data pump 20. Preferably, returning to wait for another character comprises returning from the interrupt service routine which services the asynchronous serial interface 26 interrupt.

If the put buffer is full, the controller 24 checks to see if the frame is a bad frame, in step 108. Preferably, determining if the frame is a bad frame comprises calculating a CRC on the frame and comparing the calculated CRC with a CRC transmitted with the frame. Determining if the frame is a bad frame may also comprise checking for various valid values within the control characters of the frame.

If the controller 24 determines that the frame is good, the controller 24 sets a "full flag", which the controller 24 maintains for each buffer 32, to indicate that the buffer contains a valid frame, in step 112. The controller 24 then updates the put buffer, in step 114. Preferably, updating the put buffer comprises updating the put buffer pointer. In the embodiment in which two buffers are employed, updating the put buffer pointer comprises toggling the put buffer pointer to point to the other of the two buffers which was not previously the current put buffer pointer. In an alternate embodiment in which more than two frame buffers are employed, updating the put buffer pointer comprises the controller 24 setting the put buffer pointer to the next buffer in a circular FIFO manner. After updating the put buffer, the controller 24 then returns to step 102 to wait to receive another character from the data pump 20.

If the frame is bad, the controller 24 simply does nothing, i.e., returns to step 102 to wait for a new character from the data pump. By doing nothing, in particular, by not setting the full flag on the put buffer, the controller 24 essentially causes itself later to provide a filler frame, such as a "quiet frame", to the vocoder, as will be discussed with reference to the flowchart of FIG. 4. By providing a filler frame to the vocoder rather than a bad frame, the controller 24 advantageously minimize the generation of unpleasant audio noise which may be caused by the decompression of the bad frame. A common cause of the occurrence of bad frames is noise introduced onto the communications line 14 during transmission of the frame from the far end modem to the modem 12.

Preferably, the filler frame is a "quiet frame." A "quiet frame" comprises a frame of compressed audio which was sampled with the microphone portion of a telephone subscriber handset removed from the circuit thereby producing a frame in which sound is essentially absent. That is, only white noise is sampled and stored in the quiet frame. In an alternate embodiment, a quiet frame comprises a frame in which silence has been compressed. In an alternate embodiment, a quiet frame comprises a frame in which the volume parameter of the compressed speech has been assigned a zero value. Alternatively, the filler frame is a copy of the immediately previous frame.

It is noted that during operation of the controller 24 as described in FIG. 3, the controller 24 does not check to see if the current put buffer is already full before putting characters into the put buffer. That is, if the data pump 20 provides frames to the controller 24 at a higher rate than the controller 24 is emptying the frames from the buffers, the result is that eventually the controller 24 will overwrite a frame in the put buffer, with the result that the overwritten frame is lost, or discarded. Advantageously, this is how the controller 24 handles data overrun and maintains synchronization between the transmit rate and the required receive rate. Another embodiment may include determining if one of the frame buffers is available to store the data frame, and discarding the data frame if none of the frame buffers are available to store the data frame.

Figure 4:
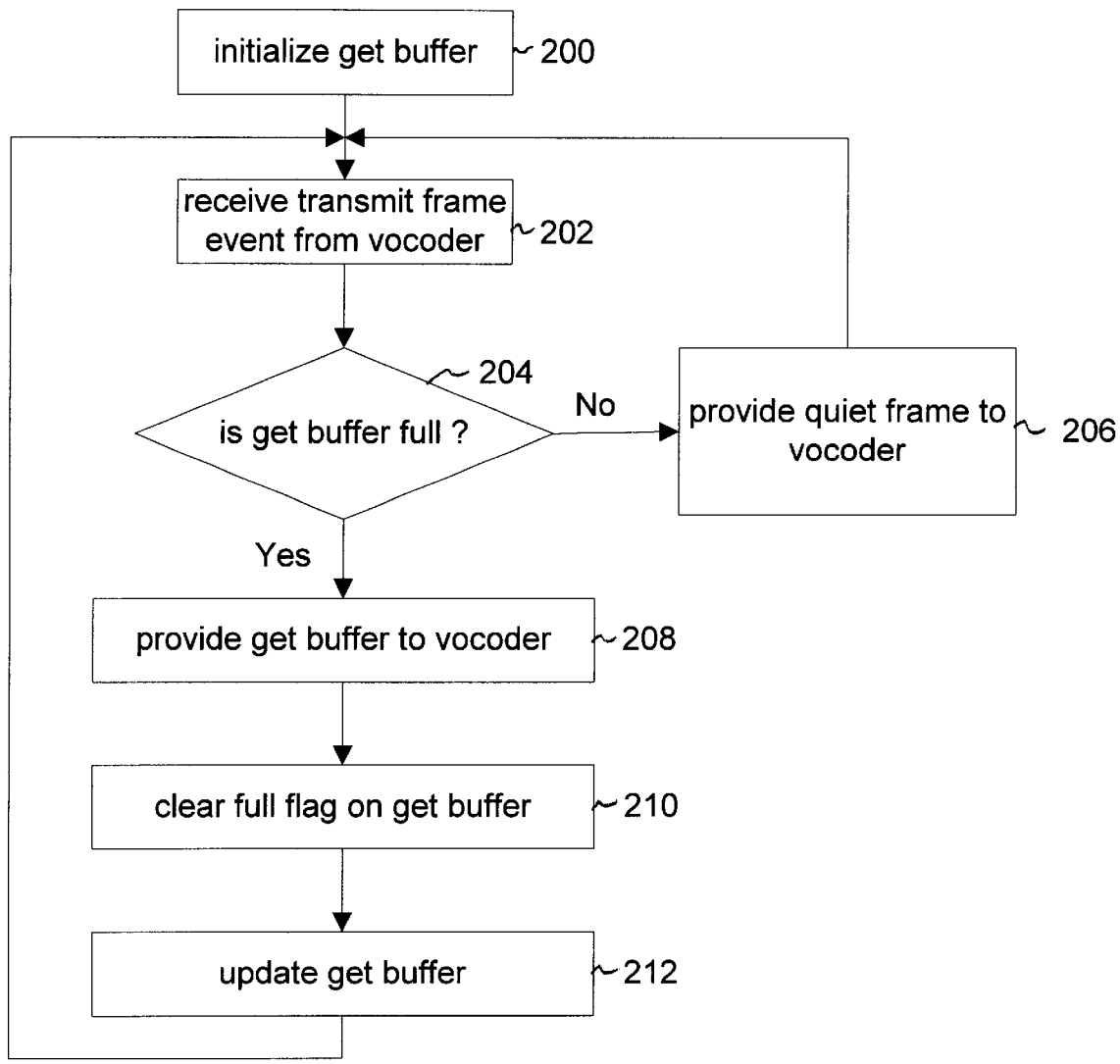
FIG. 4 is a flowchart illustrating operation of the controller of FIG. 2 retrieving frames from the buffers of FIG. 2 and providing the frames to the vocoder of FIG. 2 in a manner which handles data underrun and maintains synchronization between the transmit rate and the receive rate.

Referring now to FIG. 4, a flowchart illustrating operation of the controller 24 retrieving frames from the buffers 32 and providing the frames to the vocoder 28 in a manner which handles data underrun and maintains synchronization between the transmit rate and the receive rate is shown. The controller 24 maintains an indication of which of the frame buffers 32 of FIG. 2 is to be the next buffer to get a data frame from to provide to the vocoder 28. This buffer is referred to as the "get buffer." Preferably, the controller 24 maintains a get buffer pointer which points at the current get buffer. At initialization time, the controller 24 initializes the get buffer pointer to one of the same one of buffers 32 which was initialized as the put buffer during step 100 of FIG. 3, in step 200. The controller 24 then waits to receive a clock tick indicating it is time to provide a frame to the vocoder 28.

As previously mentioned, preferably the clock tick is a tick of the transmit clock generated by the vocoder 28 which indicates that the vocoder 28 desires to provide a frame to the controller 24 for transmission to the far end modem. Preferably, the transmit clock ticks occur at a fixed periodic rate which insures that the controller 24 will empty frames from data pump 20 at a fixed periodic rate. It is noted, however, that this fixed periodic rate, i.e., the transmit clock rate, may not be precisely the same as the clock rate of the far end modem, i.e., the rate at which the far end modem transmits frames. Therefore, data underrun or data overrun may occur as the differences between the two clock rates accumulates over time. As previously mentioned, preferably the transmit clock tick comprises the vocoder 28 interrupting the controller 24 to indicate that the vocoder 28 desires to provide a frame to the controller 24, also referred to as a transmit frame event.

During operation, the controller receives a transmit frame event, in step 202. In response to the transmit frame event, the controller 24 determines if the current get buffer has a valid frame, i.e., if the get buffer is full, in step 204. Preferably, determining if the get buffer has a valid frame comprises checking the full flag of the get buffer to see if the get buffer is full. It is noted that initially, i.e., prior to the reception of the first frame by the modem 12 from the far end modem, the get buffer is the same as the put buffer. If the get buffer is not valid, a data underrun condition has occurred and the controller 24 handles the data underrun condition by providing a quiet frame to the vocoder, in step 206, thereby maintaining synchronization between the transmit rate and the required receive rate. This handling of the data underrun condition advantageously serves to minimize the generation of unpleasant audio noise which may be caused by the underrun condition caused by the lack of synchronization between the far end rate of transmitting frames and the required frame receive rate of the vocoder 28. After providing the quiet frame to the vocoder the controller 24 returns to step 202 to wait for another transmit frame event from the vocoder 28.

If the controller 24 determines that the get frame is valid, the controller 24 provides the frame in the get buffer to the vocoder 28, in step 208. By providing frames to the vocoder 28 at the transmit rate generated by the vocoder 28, the controller 24 advantageously provides frames to the vocoder 28 at a rate which avoids overrunning or underrunning the vocoder 28, i.e., avoids providing frames to the vocoder 28 too slowly or too quickly for the vocoder 28 to decode frames.

After providing a frame to the vocoder 28, the controller 24 clears the full flag on the get buffer, in step 210, to indicate that the get buffer is no longer valid. The controller 24 then updates the get buffer, in step 212. Preferably, updating the get buffer comprises updating the get buffer pointer. In the embodiment in which two buffers are employed, updating the get buffer pointer comprises toggling the get buffer pointer to point to the other of the two buffers which was not previously the current get buffer pointer. In an alternate embodiment in which more than two frame buffers are employed, updating the get buffer pointer comprises the controller 24 setting the get buffer pointer to the next buffer in a circular FIFO manner. After updating the get buffer, the controller 24 then returns to step 202 to wait for another transmit frame event from the vocoder 28.

Although the present invention has been described with reference to a modem which processes audio data, it is noted that the present method for synchronizing unsynchronized transmit and receive clocks to handle data underrun and overrun may be employed in any system in which a slight variance may occur between the transmit clock rate and the receive clock rate and which can tolerate occasional loss of a data frame, or occasional insertion of a benign data frame. For example, the vocoder 28 may comprise any device which decodes encoded data, such as MPEG video decoder. The present invention may also be employed in data transmission where all frames must be correctly received and missing or damaged frames are retransmitted.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for compensating for variances between a first rate at which a first modem transmits a series of data frames to a second modem and a second rate at which the second modem requires reception of the series of data frames, wherein the second modem comprises a vocoder, the method comprising:

determining according to the second rate if a next data frame in the series of data frames has been received;

providing the next data frame to the second modem vocoder if the next data frame has been received;

providing a filler frame to the second modem vocoder if the next data frame has not been received; and repeatedly performing said determining, said providing the next data frame, and said providing a filler frame for at least a plurality of the series of data frames.

2. The method of claim 1, wherein said data frames comprise compressed speech frames.

3. The method of claim 2, wherein said filler frame comprises a quiet compressed speech frame.

4. The method of claim 2, further comprising said vocoder decoding said compressed speech frames.

5. The method of claim 1, wherein said first and second modems are operable to perform digital simultaneous voice and data (DSVD) communications.

6. The method of claim 1, further comprising determining if said next data frame is bad, wherein said next frame is not indicated as having been received if said next frame is bad.

7. The method of claim 1, further comprising determining if said next data frame has been received at a rate which exceeds the second rate, and discarding said next data frame if said next data frame has been received at a rate which exceeds the second rate.

8. The method of claim 1, wherein said second modem further comprises one or more frame buffers for storing the series of data frames, wherein said method further comprises determining if one of said one or more frame buffers is available to store said next data frame, and discarding said next data frame if none of said one or more frame buffers is available to store said next data frame.

9. The method of claim 1, wherein said second modem further comprises one or more frame buffers for storing the series of data frames, wherein said method further comprises overwriting a frame in one of said frame buffers with said next data frame so that the overwritten frame is discarded.

10. A system comprising:

a first modem operable to transmit a series of data frames at a first rate on a communications path; and a second modem comprising:

a data pump for coupling to the communication path, wherein the data pump is operable to receive the series of transmitted data frames, wherein the series of transmitted data frames are transmitted at said first rate;

a vocoder operable to receive data frames at a second rate; and a controller coupled to said data pump and said vocoder;

wherein said controller is operable to compensate for variances between said first rate and said second rate:

wherein said controller is operable to receive a signal from said vocoder indicating said second rate and determine responsive to said signal if a next data frame in the series of data frames has been received; and wherein the controller provides the next data frame to the vocoder if the next data frame has been received and provides a filler frame to the vocoder if the next data frame has not been received.

11. The system of claim 10, wherein said data frames comprise compressed speech frames.

12. The system of claim 11, wherein said filler frame comprises a quiet compressed speech frame.

13. The system of claim 11, wherein said vocoder is operable to decode said compressed speech frames.

14. The system of claim 10, wherein said first and second modems are configured to perform digital simultaneous voice and data (DSVD) communications.

15. The system of claim 10, wherein said controller further determines if said next data frame is bad, wherein said next frame is not indicated as having been received if said next frame is bad.

16. A modem, comprising:

a data pump for coupling to a communication path, wherein the data pump is operable to receive a series of transmitted data frames, wherein the series of transmitted data frames are transmitted at a first rate;

a vocoder operable to receive data frames at a second rate; and a controller coupled to said data pump and said vocoder;

wherein said controller is operable to compensate for variances between said first rate and said second rate:

wherein said controller is operable to receive a signal from said vocoder indicating said second rate and determine responsive to said signal if a next data frame in the series of data frames has been received; and wherein the controller provides the next data frame to the vocoder if the next data frame has been received and provides a filler frame to the vocoder if the next data frame has not been received.

17. The modem of claim 16, wherein said data frames comprise compressed speech frames.

18. The modem of claim 17, wherein said filler frame comprises a quiet compressed speech frame.

19. The modem of claim 17, wherein said vocoder is operable to decode said compressed speech frames.

20. The modem of claim 16, wherein said modem is configured to perform digital simultaneous voice and data (DSVD) communications.

21. The modem of claim 16, wherein said controller further determines if said next data frame is bad, wherein said next frame is not indicated as having been received if said next frame is bad.

22. A computer-readable storage medium comprising program instructions, wherein said program instructions are operable to implement steps for compensating for variances between a first rate at which a first modem transmits a series of data frames to a second modem and a second rate at which the second modem requires reception of the series of data frames, wherein the second modem comprises a vocoder, the steps comprising:

determining according to the second rate if a next data frame in the series of data frames has been received;

providing the next data frame to the second modem vocoder if the next data frame has been received;

providing a filler frame to the second modem vocoder if the next data frame has not been received; and repeatedly performing said determining, said providing the next data frame, and said providing a filler frame for at least a plurality of the series of data frames.

* * * * *